United States Patent Office 3,288,861
Patented Nov. 29, 1966

---

3,288,861
ALKYL PEROXIDE ADDITION COMPOUNDS
Kazuo Higashiuchi, Chicago, Ill., assignor to J. R. Short Milling Company, Chicago, Ill., a corporation of Illinois
No Drawing. Filed Aug. 31, 1962, Ser. No. 220,895
10 Claims. (Cl. 260—610)

This invention relates to organic peroxides and more particularly to certain new organic peroxide addition compounds, their preparation, and compositions including them.

In recent years, workers skilled in the preparation of organic peroxides have discovered the existence of monomeric dihydroperoxides of the general formula (1) 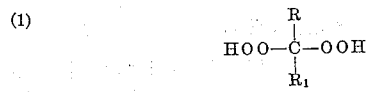

where R and $R_1$ are the same or different lower alkyl radicals each having 1–4 carbon atoms. Typical of such compounds is 2,2-dihydroperoxy propane. Despite the presence of two hydroperoxy groups on the same carbon atom, such compounds have proved to be reasonably stable.

Lower molecular weight compounds of this class do not occur as solids at room temperature. Thus, 2,2-dihydroperoxy propane is a very viscous material at room temperature. Further, dihydroperoxy compounds of this class are difficult and dangerous to prepare in pure and semi-pure form. Accordingly, such compounds are presently used in solution, or are deposited from solution on solid carrier materials.

I have discovered that, when dihydroperoxy alkyl compounds of the class referred to above are reacted with a potassium base under proper conditions, novel addition compounds of the general formula (2) 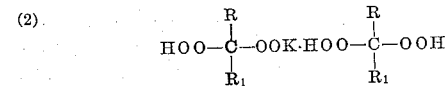

where R and $R_1$ have the aforesaid significance, are formed and can be recovered as solids. Thus, for example, I have been able to recover the addition compound 2-hydroperoxy-2-potassiumperoxy propane·2,2-dihydroperoxy propane, having the formula (3) 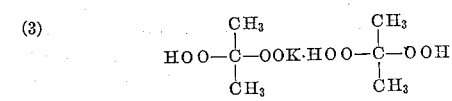

in pure form.

Such compounds are particularly useful as bleaching agents and for other purposes requiring a high active oxygen content. In this connection, it is noteworthy that the potassium compound of Formula 3 has a distinctly higher active oxygen content, at 25.2% by weight, than do potassium peroxide and the cyclic trimeric acetone peroxide, for example.

The new addition compounds are prepared by reacting the corresponding monomeric dihydroperoxy alkyl compound with a potassium base, while maintaining the reactants in a liquid medium, at room temperature or below. As the base, I have successfully used potassium hydroxide and potassium carbonate, for example. The liquid medium can be water; low boiling solvents of the ether type; ketones; low boiling chlorinated hydrocarbons, including particularly carbon tetrachloride and chloroform; and aromatic solvents, such as benzene, toluene and the xylenes. While the base can be added in solid form, aqueous solutions are superior.

Optimum results are obtained when the molar ratio of the base to the monomeric dihydroperoxy alkyl compound is about 1:1, though this molar ratio can vary in the range of from 1:2 to 1.5:1. If the relative proportion of the base is decreased to an extent such that the molar ratio is less than 1:2, the yield of the desired addition compound is seriously reduced. If the relative proportion of the base is increased to such an extent that the molar ratio is above 1.5:1, destruction of the peroxide occurs and the yield is accordingly again reduced.

The solvent employed, whether water or an organic solvent, is advantageously kept to an amount equal to 30–50% by weight of the total reaction mixture. When the solvent is water, it is particularly important to keep the water content below about 50%. With organic solvents, somewhat higher proportions of solvent can be used.

It is particularly convenient and advantageous to carry out the reaction by combining the base with an unpurified, aqueous reaction product mixture containing the monomeric dihydroperoxy alkyl compound, such reaction product mixture being obtained from the corresponding ketone and hydrogen peroxide. Such reaction product mixtures normally contain, in addition to the monomeric dihydroperoxy alkyl compound, unreacted ketone and hydrogen peroxide and smaller proportions of the corresponding dimeric dihydroperoxy alkyl compound. Thus, for example, acetone and aqueous hydrogen peroxide can be reacted to yield the monomer (2,2-dihydroperoxy propane) and the dimer [bis-(1,1'-hydroperoxy 1,1'-methyl) diethyl peroxide] in weight ratios on the order of from 3:1 to 10:1. Though the polymeric constituent or constituents, such as the dimeric compound, can be removed before preparation of the addition compound, I have found that addition of the base to the unpurified aqueous reaction product mixture yields a precipitate at least predominantly comprising the desired addition compound (Formula 2), which precipitate can be purified by washing and recrystallization. Hence, in effect, the method of the present invention constitutes a procedure for isolating the desired monomeric compounds from unpurified reaction product mixtures containing them.

The following examples illustrate the invention:

EXAMPLE 1

A. *Preparation of reaction product mixture containing 2,2-dihydroperoxy propane.* — 57 ml. aqueous hydrogen peroxide solution (50% $H_2O_2$ by weight) and 37 ml. acetone are mixed and cooled to 0° C. The reaction mixture is catalyzed by addition of 2 ml. of 1 N. hydrochloric acid. Employing a crushed ice-salt-water bath, the reaction mixture is kept at 0–10° C. for 60 min. The resulting reaction product mixture is then neutralized by addition of 2.3 ml. of 1 N. sodium hydroxide. The reaction product mixture is a clear, water white solution, free from precipitates, analyzing:

| | G. |
|---|---|
| 2,2-dihydroperoxy propane | 37.8 |
| Polymeric acetone peroxides | 9.1 |
| Hydrogen peroxide | 5.1 |
| Acetone | 1.0 |
| Water | Balance |

B. *Preparation of 2-hydroperoxy-2-potassiumperoxy propane·2,2-dihydroperoxy propane.*—10 g. of the reaction product mixture obtained above is placed in an open vessel and 4 g. of aqueous potassium hydroxide solution (50% KOH by weight) is added. The mixture is stirred continuously and maintained slightly below room temperature. A white, snowy precipitate forms within a few minutes, filling the entire vessel. The precipitate is separated from the mother liquor, using a sintered glass funnel filter with vacuum aspirator. The recovered precipitate is washed three times with 20 ml. lots of methanol. The resulting washed solid, amounting to approximately 6 g., is a dry, white, practically odorless crystalline material, all of the crystals appearing flat under the microscope.

The product is further purified by dissolving in water (10:1, water-to-solid) and then cooling to accomplish recrystallization. The crystals are recovered by filtration and washed, first with acetone and then with ethyl ether.

*Analysis.*—(1) Calculated for 2 - hydroperoxy - 2 - potassiumperoxy propane·2,2 - dihydroperoxy propane: K=15.35%, active $O_2$=25.2%. (2) Found: K=15.30%, active $O_2$=25.2%.

*Analytical procedures.*—Potassium: Dissolve 0.2 g. sample in 25 ml. water. Add a few drops of methyl red. Titrate to deep orange end point with 0.1 N. hydrochloride acid. Double-check against conventional gravimetric determination for potassium. Active oxygen: To a 100 mg. sample, add 50 ml. sulfuric acid (1 part $H_2SO_4$+9 parts $H_2O$, by weight), allowing to stand for 3 min. Titrate to faint pink end point with 0.1 N. potassium permanganate.

To show existence of 2,2-dihydroperoxy propane in the addition compound, a sample of the pure product is dissolved in water and the solution then extracted with ethyl ether as a selective solvent for 2,2-dihydroperoxy propane. The solvent is then eliminated and the residue titrated for active oxygen. Calculated and found: 29.8%.

Pure 2-hydroperoxy - 2 - potassiumperoxy propane·2,2-dihydroperoxy propane is a white, crystalline, practically odorless solid at room temperature. The compound decomposes before melting, is highly explosive, and flashes with a purplish color when exposed to open flame. The compound is autoexplosive and friction-sensitive and, in pure form, must be handled with care. The compound is stable, however, in the sense that it retains its active oxygen content substantially without change under normal conditions and even at elevated temperatures. Thus, a 25 mg. sample of 2-hydroperoxy-2-potassiumperoxy propane·2,2-dihydroperoxy propane in pure, solid form was held in an oven for 1 hour at 100° C., without explosion or detectable weight loss and with only negligible loss of active oxygen.

EXAMPLE 2

A. *Preparation of essentially pure 2,2-dihydroperoxy propane and essentially pure bis-(1,1'-hydroperoxy 1,1'-methyl) diethyl peroxide.*—The procedure of section A of Example 1 is repeated to provide an aqueous reaction product mixture containing 2,2-dihydroperoxy propane and bis-(1,1'-hydroperoxy 1,1'-methyl) diethyl peroxide in a weight ratio of approximately 4:1. 100 ml. of this reaction product mixture is successively extracted with 9 lots of hexane, each 600 ml. in volume. The aqueous residue is recovered and the nine extracts combined.

The aqueous residue is vacuum distilled, for removal of free water and hydrogen peroxide, on a 45° C. water bath under high vacuum for 15 min., yielding essentially pure 2,2-dihydroperoxy propane as a thick, viscous, water-white odorless liquid.

The combined extract is cooled, using an acetone-dry ice bath, to about −70° C., yielding a white, crystalline precipitate which is recovered as essentially pure bis-(1,1'-hydroproxy 1,1'-methyl) diethyl peroxide.

The 2,2-dihydroperoxy propane and bis-(1,1'-hydroperoxy 1,1'-methyl) diethyl peroxide are dissolved in water to provide separate solutions, one containing 10% by weight of the monomeric compound and the other containing 10% by weight of the dimeric compound.

B. *Comparison of 2,2-dihydroperoxy propane and bis-(1,1'-hydroperoxy 1,1'-methyl) diethyl peroxide.*—The aqueous solution of 2,2-dihydroperoxy propane obtained in section A of this example is reacted with potassium peroxide, following the procedure of Example 1B. Essentially pure 2-hydroxy-2-potassiumperoxy propane· 2,2-dihydroperoxy propane is obtained, as in Example 1. When potassium peroxide is added to the pure solution of bis-(1,1'-hydroperoxy 1,1'-methyl) diethyl peroxide, no precipitate is obtained.

EXAMPLE 3

The procedure of section A of Example 1 was followed to produce an aqueous reaction product mixture containing 2,2-dihydroperoxy propane and polymeric acetone peroxides in substantially the proportions indicated in section A of Example 1. 10 g. of this reaction product mixture was placed in an open vessel and 3 g. of aqueous potassium carbonate solution (50% $K_2CO_3$ by weight) added. The reaction mixture was allowed to stand at room temperature overnight. A voluminous, snowy, white precipitate resulted. The yield was approximately ⅓ of that obtained in Example 1. Recovered, but not purified by recrystallization, the product was found to contain 15.0% potassium, 25.0% active oxygen.

EXAMPLE 4

The procedure of section A of Example 1 was followed to produce an aqueous reaction product mixture having substantially the constituency there indicated. 25 ml. of this liquid product was combined with 25 ml. of ethyl ether, mixed, and allowed to stand at room temperature until distinct upper and lower phases had separated. The upper phase was recovered by decanting and dried with anhydrous sodium sulfate to yield an ethyl ether solution of the organic peroxides which were contained in the aqueous reaction product mixture. To this solution at room temperature was added 6 g. of aqueous potassium hydroxide solution (50% KOH by weight). A snowy white percipitate occurred instantly and was recovered by vacuum filtration. The recovered precipitate was first washed with ethyl alcohol and then with ethyl ether. Analyzed without recrystallization, the product was found to contain 15.2% potassium, 25.0% active oxygen.

EXAMPLE 5

The procedure of section B of Example 1 was repeated to obtain 25 g. of pure 2-hydroperoxy-2-potassiumperoxy propane·2,2-dihydroperoxy propane in dry, crystalline form. This quantity of the addition compound was combined with 25 g. of dry, food grade corn starch and the resulting composition agitated in a flour blender to accomplish uniform mixing. For comparative purposes, a quantity of pure aqueous solution of 2,2-dihydroperoxy propane was prepared, following the procedure of section A of Example 2.

Two equal quantities of the same unbleached, commercial bread wheat flour were obtained. To one such quantity of the flour, the mixture of crystalline 2-hydroperoxy-2-potassiumperoxy propane·2,2 - dihydroperoxy propane and corn starch was added in an amount introducing into the flour a hydrogen peroxide equivalent content of 0.003% of the flour weight. The aqueous solution of 2,2-dihydroperoxy propane was sprayed into the other quantity of flour in an amount introducing thereto a hydrogen peroxide equivalent content of 0.003% of the flour weight. The two lots of flour were separately agitated to accomplish uniform distribution of the treating agents therethrough, and were then allowed to stand for 5 days, at the end of which time the carotene contents were determined and compared to determine the relative amounts of bleaching which had occurred. It was found that both quantities of flour were bleached to essentially the same extent, indicating that 2-hydroperoxy-2-potassiumperoxy propane·2,2 - dihydroperoxy propane has essentially the same flour bleaching ability as does 2,2-dihydroperoxy propane. Both bleached quantities of flour were used to make bread in conventional fashion, the doughs being observed for indications that the flour was adequately matured. The dough characteristics were the same for each flour and indicated that good maturing had been accomplished in each case.

EXAMPLE 6

A. *Preparation of methyl ethyl ketone peroxide reaction product mixture including 2,2'-dihydroperoxy butane.*—114.0 ml. of aqueous hydrogen peroxide (50% $H_2O_2$ by weight), 89.5 ml. methyl ethyl ketone, and 2.0 ml. of aqueous sulfuric acid (20% $H_2SO_4$ by weight) were mixed in an open Pyrex vessel and maintained for 1 hour at 30° C. At the end of that period, 15.0 ml. of 1 N. sodium hydroxide solution was added to neutralize the acid. The reaction mixture was agitated throughout the 1-hour period to avoid phase separation during the reaction. After addition of the sodium hydroxide, 89.5 ml. of methyl ethyl ketone was added to promote phase separation and the liquid mixture was allowed to stand until distinct upper and lower phases had formed. The lower layer was removed, using a separatory funnel, and the upper layer recovered and dried with anhydrous sodium sulfate.

B. *Preparation of 2-hydroperoxy-2-potassiumperoxy butane·2,2-dihydroperoxy butane.*—50.0 ml. of the recovered, dried material from section A of this example was combined at room temperature in an open vessel with 16.0 g. of aqueous potassium hydroxide (50% KOH by weight). A voluminous white precipitate formed after approximately 30 sec. The precipitate was recovered by vacuum filtration, washed 4 times with ethanol, and dried with ethyl ether. 7 g. of dry precipitate was recovered. Analyzed at this stage, the product was found to contain 13.1% potassium, 22.3% active oxygen. The recovered product was agitated in 30.0 ml. distilled water and the solution filtered to remove the undissolved portion. The clear solution was cooled to 5° C. and held at that temperature for 3 hr. The resulting crystallized material, amounting to 0.5 g., was recovered and washed twice with ethanol and twice with ethyl ether. Analysis of recrystallized product: (1) Calculated for 2-hydroperoxy-2-potassiumperoxy butane·2,2-dihydroperoxy butane: K=13.8%, active $O_2$=22.8%. (2) Found: K=13.5%, active $O_2$=22.6%.

The essentially pure 2-hydroperoxy-2-potassiumperoxy butane·2,2-dihydroperoxy butane was a practically odorless white crystalline solid at room temperature. The compound decomposes before melting and, upon decomposition, exhibits a strong ketone odor. The compound is autoexplosive and friction-sensitive and flashes with a purplish color when exposed to open flame. The compound retains its active oxygen content substantially without change under normal conditions, however, and is safe for storage, handling and use when blended with a suitable diluent. Typically, a dry mixture of 1 part by weight of 2-hydroperoxy-2-potassium-peroxy butane·2,2-dihydroperoxy butane and 2 parts by weight of food grade corn starch is suitable for commercial usage as an oxidatively active composition.

EXAMPLE 7

A. *Preparation of diethyl ketone peroxide reaction product mixture including 3,3-dihydroperoxy pentane.*—43.0 g. of diethyl ketone, 68.0 g. of aqueous hydrogen peroxide (50% $H_2O_2$ by weight), and 1.0 ml. of aqueous sulfuric acid (20% $H_2SO_4$ by weight) were mixed in an open Pyrex vessel and maintained, with agitation, at 27–34° C. for 1 hr. At the end of that period, the reaction product mixture was allowed to stand at room temperature and separated into distinct upper and lower phases. Using a separatory funnel, the upper phase was recovered and dried with anhydrous sodium sulfate. The recovered, dried reaction product mixture contained both 3,3-dihydroperoxy pentane and the corresponding dimeric dihydroperoxy compound.

B. *Preparation of 3-hydroperoxy-3-potassiumperoxy pentane·3,3-dihydroperoxy pentane.*—25.0 ml. of the recovered, dried upper phase of the reaction product mixture obtained in section A of this example was combined at room temperature in an open vessel with 7.5 g. of aqueous potassium hydroxide (50% KOH by weight). A voluminous white precipitate formed instantaneously and was recovered by vacuum filtration. The recovered precipitate was washed 4 times with ethanol and dried at room temperature in the separatory funnel. The product was analyzed without recrystallization: (1) Calculated for 3-hydroperoxy-3-potassiumperoxy pentane·3,3-dihydroperoxy pentane: K=12.6%, active $O_2$=20.7%. (2) Found: K=12.4%, active $O_2$=20.0%.

The substantially pure 3-hydroperoxy-3-potassiumperoxy pentane·3,3-dihydroperoxy pentane was an odorless white solid at room temperature, moderately soluble in methanol and moderately soluble in water. The compound decomposes, exhibiting a strong ketone odor, before melting. The compound is autoexplosive and friction-sensitive and flashes with a purplish color when exposed to open flame. It retains its active oxygen content substantially without change under normal conditions and, when mixed with a suitable solid diluent, is safe for storage, handling and commercial use as an oxidatively active material.

EXAMPLE 8

A. *Preperation of methyl isopropyl ketone peroxide reaction product mixture containing 2,2-dihydroperoxy-3-methyl butane.*—43.0 g. of methyl isopropyl ketone and 68.0 g. of aqueous hydrogen peroxide (50% $H_2O_2$ by weight) were combined in an open Pyrex vessel and cooled to room temperature. To catalyze the reaction mixture, 0.50 ml. of aqueous sulfuric acid (20% $H_2SO_4$ by weight) was added. The mixture was stirred for 1 hr. at room temperature and then allowed to stand for phase separation. The lower layer was removed and the upper layer recovered and dried with anhydrous sodium sulfate. The recovered upper layer, upon analysis, was found to have an organic peroxide content of 29.7% by weight and a hydrogen peroxide equivalent content of 33.2%. Of the organic peroxide content, a major proportion was the monomeric compound 2,2-dihydroperoxy-3-methyl butane having the structural formula (4)

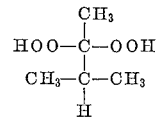

the corresponding dimeric dihydroperoxide also being present.

B. *Preparation of 2-hydroperoxy-2-potassiumperoxy-3-methyl butane·2,2-dihydroperoxy-3-methyl butane.*—25.0 ml. of the recovered, dried upper phase was mixed in an open vessel with 7.5 g. of aqueous potassium hydroxide (50% KOH by weight), the mixture being at room temperature. A voluminous precipitate occurred immediately. Recovered by vacuum filtration, the precipitate was washed 4 times with ethanol and then dried with ethyl ether, 5.5 g. of dry crystals being recovered. Analysis without recrystallization: (1) Calculated for 2-hydroperoxy-2-potassiumperoxy-3-methyl butane·2,2-dihydroperoxy-3-methyl butane: K=12.6%, active $O_2$=20.7%. (2) Found: K=12.7%, active $O_2$=20.5%.

The compound is a white, odorless, crystalline solid at room temperature, moderately soluble in methanol and in water. It is autoexplosive and friction-sensitive and flashes with a purplish color upon exposure to open flame. Despite its explosive nature, the compound retains its active oxygen content under normal conditions and is made safe for storage, handling and use when blended with a suitable inert solid diluent.

EXAMPLE 9

A. *Preparation of methyl isobutyl ketone peroxide reaction product mixture including 2,2-dihydroperoxy-4-methyl pentane.*—50.0 g. of methyl isobutyl ketone, 68.0 g. of aqueous hydrogen peroxide (50% $H_2O_2$ by weight) and 0.5 ml. of aqueous sulfuric acid (20% $H_2SO_4$ by weight) were combined in an open vessel and stirred for 2 hrs. at room temperature. At the end of that period, the reaction product mixture was allowed to stand for phase separation. When the mixture had separated into two distinct layers, the lower phase was removed and the upper phase dried with anhydrous sodium sulfate. The recovered, dried upper phase was found to have an organic peroxide content of 21.8% by weight and a hydrogen peroxide equivalent content of 24.3%. Of the organic peroxide content, a substantial proportion was 2,2-dihydroperoxy-4-methyl pentane, having the formula (5)

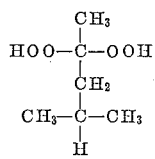

the corresponding dimeric dihydroperoxide also being present as a material constituent.

B. *Preparation of 2-hydroperoxy-2-potassiumperoxy-4-methyl pentane·2,2 - dihydroperoxy - 4-methyl pentane.*— 25.0 ml. of the recovered, dried upper layer was mixed at room temperature in an open vessel with 7.5 g. of aqueous potassium hydroxide (50% KOH by weight). A voluminous precipitate occurred immediately and was recovered by vacuum filtration. After washing 4 times with ethanol and drying in the separatory funnel at room temperature, the recovered crystals amounted to 8.0 g. Analyzed at this stage, the product was found to contain 12.3% by weight potassium and 18.4% active oxygen. 2.5 g. of the product was dissolved in 40.0 ml. of methanol and the solution filtered to remove undissolved material. The clear solution was then cooled to −20° C. and held at that temperature overnight. The precipitate was recovered by vacuum filtration and dried by first volatilizing the residual methanol and then washing with ethyl ether.

*Analysis.*—(1) Calculated for 2-hydroperoxy-2-potassium-peroxy-4-methyl pentane·2,2-dihydroperoxy-4-methyl pentane: K=11.5% by weight, active $O_2$=19.0%. (2) Found: K=11.6% by weight, active $O_2$=19.0%.

The pure compound is an odorless, white, crystalline solid which is only slightly soluble in water and moderately soluble in methanol. The compound is autoexplosive and friction-sensitive and flashes with a purplish color upon contact with open flame. It retains its active oxygen content under normal conditions and is safe for storage, handling and use when blended with corn starch or a like particulate diluent.

The examples demonstrate that the invention provides a method for obtaining specific addition compounds of the type described without requiring that the corresponding monomeric dihydroperoxide be first obtained in pure form. Thus, it is an advantage of the invention that the method may commence with reaction of aqueous hydrogen peroxide and the corresponding acyclic ketone to provide either a crude reaction product mixture or a reaction product mixture which has been only partially purified, the potassium base then being added to the reaction product mixture directly with the result that the potassium base reacts selectively with the monomeric dihydroperoxide and only the addition compound of the monomeric dihydroperoxide precipitates. In the case of acetone, the initial reaction product mixture, containing both the monomeric dihydroperoxide and at least the corresponding dimer, can be produced by any of the procedures described in copending applications Serial No. 15,783, filed June 23, 1959, on behalf of Herbert O. Renner, now U.S. Patent 3,085,014; Serial No. 75,774, filed December 14, 1960, on behalf of Kazuo Higashiuchi, now U.S. Patent 3,077,412; Serial No. 75,692, filed December 14, 1960, on behalf of Kazuo Higashiuchi and Edward J. Schwoegler, now U.S. Patent 3,160,667; and Serial No. 200,378, filed June 6, 1962, on behalf of Edward J. Schwoegler.

Examples 6–9 illustrate the fact that the initial ketone-peroxide reaction mixture can be purified or concentrated at least to a degree before addition of the potassium base when the ketone is one having the general formula

where R is an alkyl group having 1–4 carbon atoms and $R_1$ is an alkyl group having 2–4 carbon atoms. In such instances, the reaction product mixture can be caused to separate into two distinct phases differing in specific gravity, the greater proportion of the monomeric dihydroperoxide being concentrated in the phase of lower specific gravity so that that phase can be segregated as the material with which the potassium base is to be mixed.

Since the potassium base reacts selectively with the monomeric dihydroperoxide and does not react, at least to such an extent as will result in precipitation of a solid product, with the polymeric dihydroperoxides, and since the addition compound contains 1 molecule of the monomeric dihydroperoxide, this procedure provides a way for isolating the dihydroperoxide in truly pure form from the initial peroxide reaction mixture. This is true because redissolving of the addition compound in a suitable solvent therefor provides, in the resulting solution, the pure monomeric dihydroperoxide of the addition compound. Accordingly, it is only necessary to extract the solution with a selective solvent for the monomeric dihydroperoxide in order to obtain that compound alone. Thus, in Example 1, the addition compound 2-hydroperoxy - 2 - potassiumperoxy propane·2,2-dihydroperoxy propane is dissolved in water and the resulting solution extracted with ethyl ether as a selective solvent for 2,2-dihydroperoxy propane.

All of the addition compounds of Formula 2 have the unusual ability to both mature and bleach wheat flour, as described and claimed in my copending application Serial No. 220,897, now U.S. Patent 3,135,615, filed concurrently herewith. These addition compounds also exhibit dough improving effects when used in the preparation of baked goods, as described and claimed in my copending application Serial No. 220,896, now U.S. Patent No. 3,135,611, filed concurrently herewith.

While particularly advantageous embodiments of the invention have been described and illustrated by the examples, it will be recognized by those skilled in the art that various changes and modifications can be made therein without departing from the scope of the invention as defined by the appended claims.

I claim:

1. An addition compound of the general formula

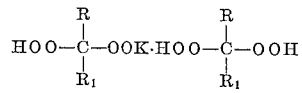

where R and $R_1$ are the same or different alkyl groups having 1–4 carbon atoms.

2. The addition compound 2-hydroperoxy-2-potassium-peroxy propane·2,2-dihydroperoxy propane.

3. The addition compound 2-hydroperoxy-2-potassium-peroxy butane·2,2-dihydroperoxy butane.

4. The addition compound 2-hydroperoxy-2-potassium-peroxy-3-methyl butane·2,2-dihydroperoxy-3-methyl butane.

5. The addition compound 2-hydroperoxy-2-potassium-peroxy - 4 - methyl pentane·2,2 - dihydroperoxy-4-methyl pentane.

6. The addition compound 3-hydroperoxy-3-potassium-peroxy pentane·3,3-dihydroperoxy pentane.

7. The method for producing an addition compound of the general formula $$HOO-\underset{R_1}{\overset{R}{C}}-OOK \cdot HOO-\underset{R_1}{\overset{R}{C}}-OOH$$

where R and $R_1$ are the same or different alkyl groups having 1–4 carbon atoms, comprising mixing a potassium base selected from the group consisting of potassium hydroxide and potassium carbonate with a solution containing both a monomeric dihydroperoxide of the general formula $$HOO-\underset{R_1}{\overset{R}{C}}-OOH$$

and a dimeric dihydroperoxide of the general formula $$HOO-\underset{R_1}{\overset{R}{C}}-OO-\underset{R_1}{\overset{R}{C}}-OOH$$

the molar ratio of said base to said monomeric dihydroperoxide being in the range of from 1:2 to 1.5:1, and thereby causing said base to react selectively with said monomeric dihydroperoxide with the precipitation of a solid crystalline product, and separately recovering said solid product, said mixing step being carried out at a temperature not substantially exceeding room temperature.

8. The method for obtaining a solid addition compound of the formula $$HOO-\underset{R_1}{\overset{R}{C}}-OOK \cdot HOO-\underset{R_1}{\overset{R}{C}}-OOH$$

where R is an alkyl radical having 1–4 carbon atoms and $R_1$ is an alkyl radical having 2–4 carbon atoms, comprising mixing aqueous hydrogen peroxide and a ketone of the formula $$\underset{R_1}{\overset{R}{C}}=O$$

in proportions and under conditions for the formation of acyclic dihydroperoxides of said ketone, and thereby providing a reaction product mixture containing in solution the monomeric compound $$HOO-\underset{R_1}{\overset{R}{C}}-OOH$$

and acyclic polymers thereof;

allowing said reaction product mixture to separate into phases of higher and lower specific gravity;

separately recovering said phase of lower specific gravity;

mixing with the phase so recovered a base selected from the group consisting of potassium hydroxide and potassium carbonate, the molar ratio of said base to said monomeric compound being in the range of from 1:2 to 1.5:1, said mixing step causing said base to react with said monomeric compound to form said addition compound as a precipitated product; and separately recovering said precipitated product.

9. The method for obtaining the addition compound 2-hydroperoxy-2-potassiumperoxy propane·2,2-dihydroperoxy propane, comprising reacting acetone and hydrogen peroxide under conditions yielding a liquid reaction product mixture which is free from cyclic acetone peroxides in solid form but which contains in solution material amounts of both 2,2-dihydroperoxy propane and bis-(1,1'-hydroperoxy 1,1'-methyl) diethyl peroxide;

mixing with said liquid reaction product mixture at a temperature not substantially exceeding room temperature a potassium base selected from the group consisting of potassium hydroxide and potassium carbonate, the molar ratio of said base to said 2,2-dihydroperoxy propane being in the range of from 1:2 to 1.5:1, said mixing step causing said base to react selectively with said 2,2-dihydroperoxy propane with resultant precipitation of said addition compound as a solid product; and separately recovering said precipitated addition compound.

10. The method for obtaining a substantially pure monomeric compound of the general formula $$HOO-\underset{R_1}{\overset{R}{C}}-OOH$$

wherein R and $R_1$ are alkyl radicals having 1–4 carbon atoms, from a solution of that compound which also contains acyclic polymers thereof, comprising mixing with said solution a potassium base selected from the group consisting of potassium hydroxide and potassium carbonate, the molar ratio of said base to said monomeric compound being in the range of from 1:2 to 1.5:1, said mixing step causing said base to react with said monomeric compound to form as a precipitated product an addition compound having the general formula $$HOO-\underset{R_1}{\overset{R}{C}}-OOK \cdot HOO-\underset{R_1}{\overset{R}{C}}-OOH$$

where R and $R_1$ have the aforesaid significance;

separately recovering said precipitated product;

dissolving the product so recovered in a liquid solvent; and extracting the resulting solution with a selective solvent for said monomeric compound.

References Cited by the Examiner
UNITED STATES PATENTS

| | | | |
|---|---|---|---|
| 2,632,026 | 3/1953 | Conner | 260—610 |
| 3,003,000 | 10/1961 | Milas | 260—610 |
| 3,135,615 | 6/1964 | Higashiuchi | 260—610 |

OTHER REFERENCES

Milas et al.: Jour. Amer. Chem. Soc., 68:207 (1946) (entire article pages 205–208).

LEON ZITVER, *Primary Examiner.*

H. G. MOORE, *Examiner.*

W. B. LONE, *Assistant Examiner.*